A. J. BAUMANN.
GRAIN HULLER.
APPLICATION FILED SEPT. 3, 1909.
965,553.
Patented July 26, 1910.
2 SHEETS—SHEET 2.
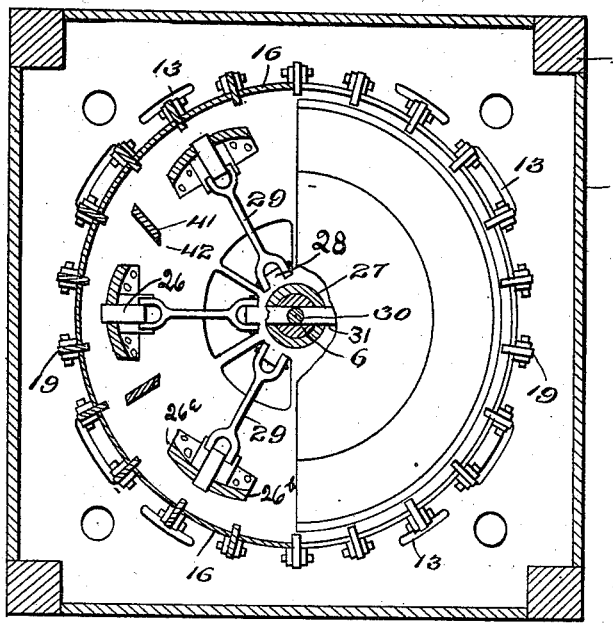
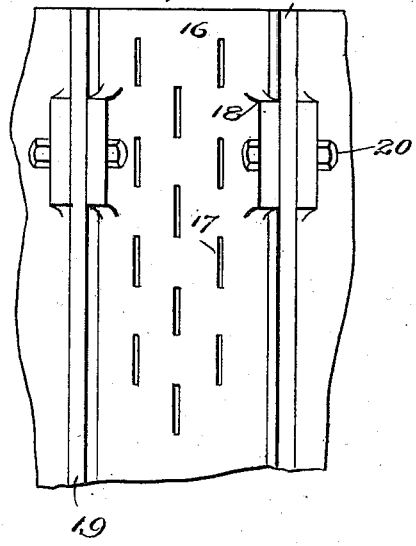
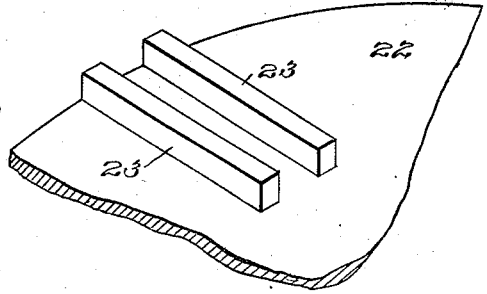
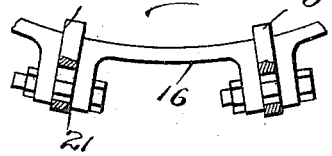
Witnesses
J. M. Fowler Jr
H. Strauss
Inventor
Albert J. Baumann
By Mason Fenwick & Lawrence
Attorneys
THE NORRIS PETERS CO., WASHINGTON, D. C.

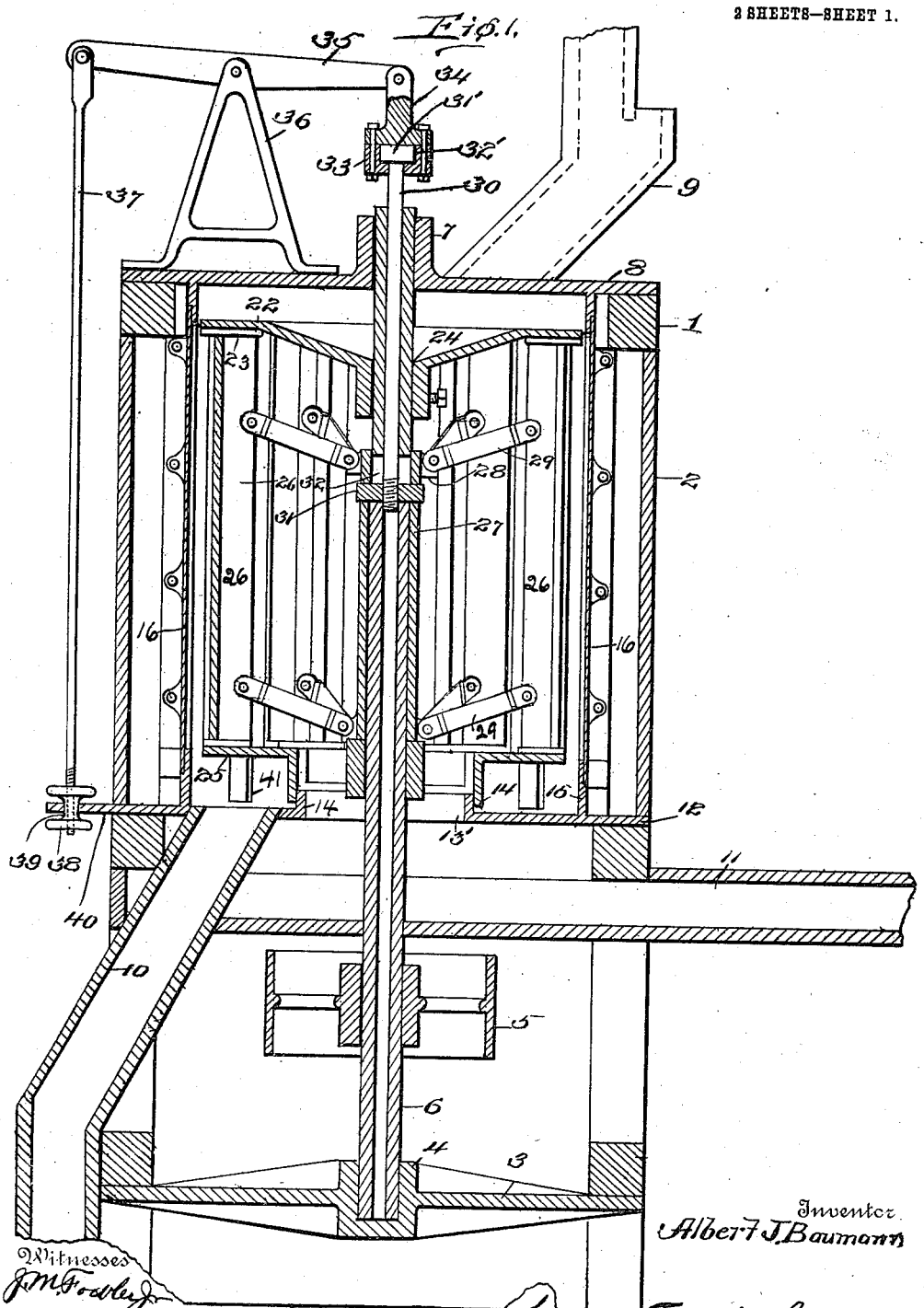

UNITED STATES PATENT OFFICE.

ALBERT J. BAUMANN, OF PORTLAND, OREGON.

GRAIN-HULLER.

965,553.

Specification of Letters Patent. Patented July 26, 1910.

Application filed September 3, 1909. Serial No. 516,053.

*To all whom it may concern:*

Be it known that I, ALBERT J. BAUMANN, citizen of the United States, residing at Portland, in the county of Multnomah and State of Oregon, have invented certain new and useful Improvements in Grain-Hullers; and I do hereby declare the following to be a full, clear, and exact description of the invention, such as will enable others skilled in the art to which it appertains to make and use the same.

This invention relates to grain hullers, and the chief object is to provide improved means for adjusting the revolving beaters.

With this object in view, the invention consists in providing a suitable stationary cylinder having stationary beaters projecting from the inner side thereof, a rotating device within such cylinder carrying beaters vertically arranged, the surfaces thereof being substantially parallel with the beaters connected with the stationary cylinder, and a reciprocating device mounted upon a central shaft having means connected therewith and with the rotating beaters for adjusting the latter while the device is in operation all as described and claimed.

In the accompanying drawings forming a part of this application, Figure 1 is a vertical section of the device: Fig. 2 is a view partly in plan and partly in horizontal section: Fig. 3 is a detail view of a portion of the outer cylinder: Fig. 4 is a detail view showing the means for adjusting the beaters connected with the outer cylinder: Fig. 5 is also a detail view showing the guides in which the rotating beaters are mounted.

In carrying out my invention, I provide a suitable framework 1, having connected therewith inclosing walls 2, while transversely of the framework a support 3, carrying a bearing 4, is arranged, as shown in Fig. 1. Mounted in bearing 4 is a vertical shaft 6 carrying a pulley 5, the upper end of such shaft being mounted in a bearing 7 on the plate 8, which constitutes the cover portion. A grain inlet chute 9, an outlet chute 10, and a duct 11 leading to a fan, are suitably located.

The lower plate 12 is provided with openings 13, for the passage of air, such plate being also provided with a central opening 13', and from the edge of this plate surrounding opening 13', flange 14 extends in an upward direction. Spaced from flange 14, and between the latter and the edge of plate 12, is another flange 15, to which latter are secured the lower ends of plates 16 of the outer cylinder or stationary casing. The plates of this outer cylinder are more clearly shown in Figs. 3 and 4, and consist of rectangular strips provided with slots or openings 17, and with ears 18 projecting from the edges, and at substantially right angles with the surface of the plates. Between plates 16 are vertical plates or beaters 19 placed on edge and arranged so that the sides thereof will lie in close contact with the edges of plates 16 and the sides of the ears 18. Bolts 20 pass through the ears and through members 19, and the latter are provided with slots 21 to permit of the adjustment of the beaters. The rotating member carrying the inner beaters is provided with an upper plate 22 having a concave portion, and with a central opening 24, through which shaft 6 passes. On the under surface of plate 22 are suitable guides parallelly arranged, and corresponding guides are provided on the lower plate 25, these guides permitting of the adjustment of beaters 26, which are permitted to slide therein, between curved and vertically arranged plates 26$^a$ and 26$^b$ secured to the upper and lower plates 22 and 25.

Mounted on the central shaft 6 is a tubular member 27 provided with ears 28, and connected with the latter are links 29, pivoted to the beaters 26 at points near their upper and lower ends. The upper portion of shaft 6 is hollow, and accommodates a rod 30, threaded into a cross bar or key 31 passing through a transverse slot 32 in the central shaft and through apertures in the tubular member 27. On the upper end of rod 30 is a collar 31' arranged to rotate in bearing 32' formed in block 33, which block is bolted to the supporting bracket 34 pivotally connected with lever 35 mounted in bracket 36. To the opposite end of lever 35 an adjusting rod 37 is secured, and this rod extends downwardly and parallel with the casing, being provided with a device 38 connected by means of a screw thread with the lower end thereof. The device 38 comprises two hand wheels connected by a central portion 39, passing through an aperture in a projecting portion 40 of plate 12.

Located between the beaters 26 are vertically arranged bars 41 the edges 42 of which are beveled, these bars being arranged at an angle as shown in Fig. 2, and being mounted in slots provided in upper plate 22 and in lower plate 25. Bars 41 extend below plate 25 and nearly to the plate 12.

It will be observed that while the device is in operation, the inner beaters connected with the rotating device may be adjusted with great precision by raising or lowering the rod 30 and therefore the tubular member 27 which will operate links 29 and throw beaters 26 toward or away from the beaters of the outer cylinder.

What I claim is:

1. In a grain huller, a framework, a casing arranged therein, said casing comprising plates constituting portions of the walls thereof and adjustable devices projecting between the plates and constituting beaters, a driving shaft mounted in the framework and passing through such casing, a tubular member carried by the shaft, said shaft being provided at its upper end with a longitudinal bore, a rod located within such bore and having connection with the tubular member, a plurality of beating devices also connected with the tubular member, and means for adjusting the position of said rod.

2. In a grain huller, a stationary casing, a series of adjustable beaters arranged in the sides thereof, a vertical shaft extending through said casing, a plurality of supporting members carried by said shafts, a tubular member also carried by the shaft, a plurality of beaters surrounding the tubular member, links connecting the beaters last mentioned with said tubular member, the shaft being provided with a longitudinal bore, a rod located within said bore, a locking member on one end of said rod and connecting the latter with the tubular member, a head on the opposite end of said rod, a recessed block in which said head is arranged to be supported, a bracket secured to said block, a lever connected to the bracket, an adjustable rod connected to the outer end of the lever, and a threaded nut carried by one end of the rod, said nut comprising a central body portion with flanged ends projecting therefrom, and a bracket having an aperture and arranged to support said body portion.

3. In a grain huller, a stationary casing, adjustable beating devices arranged between the plates constituting such casing, a shaft arranged to rotate within the casing, adjustable beating devices coöperating with the beating devices first mentioned, a tubular member carried by the shaft, means for connecting the tubular member with the adjustable beating devices, and means for adjusting the position of the tubular member on the shaft, said means comprising a rod extending lengthwise through a portion of the shaft and connected with the tubular member, a head carried by the rod, a countersunk block within which said collar and the end of the rod are arranged to rotate, a lever connected with said block and an adjustable rod connected with the opposite end of the lever.

4. In a grain huller, a framework, a casing, a shaft arranged to rotate within the casing, beaters operated by said shaft, and means for adjusting the beaters, such means comprising a tubular member and a rod arranged to reciprocate with reference to said shaft, a supporting bracket in which the upper end of the rod is loosely mounted, a lever connected with said supporting device, a rod connected with the lever, a threaded member engaging one end of said rod for the purpose of adjusting the latter, said threaded member comprising a body portion arranged to be rotatably supported and flanged members projecting laterally from the ends thereof, and an apertured bracket for receiving the body portion of such threaded member.

ALBERT J. BAUMANN.

Witnesses:
F. I. RANDALL,
A. J. SHANKS.